Patented Oct. 1, 1946

2,408,655

UNITED STATES PATENT OFFICE 2,408,655

SILICIC ACID COMPOSITIONS

Ralph K. Iler, Cleveland Heights, and Joseph S. Kirk, Seven Hills Village, Ohio, assignors to E. I. du Pont de Nemours & Company, Wilmington, Del., a corporation of Delaware No Drawing. Application April 18, 1942, Serial No. 439,548

3 Claims. (Cl. 252—309)

This invention relates to novel processes for the manufacture of silicic acid compositions and to the products produced, and is more particularly directed to processes in which silicic acid is contacted with an ester of an acid of phosphorus and to the novel compositions of silicic acid associated with esters of acids of phosphorus thus produced.

It is an object of this invention to provide processes whereby novel products comprising silicic acid and esters of acids of phosphorus are produced. Another object is to provide processes for producing solutions of polysilicic acid in esters of phosphorus oxy-acids. Another object is to provide processes for esterifying polysilicic acid with trialiphatic esters of phosphorus oxy-acids. A further object is to provide as novel compositions the products of the foregoing processes. A further object is to prepare directly from silicic acid, which is available from sodium silicate, useful relatively stable solutions of polysilicic acids in organic solvents. Further objects will appear hereinafter.

The foregoing and other objects of this invention are accomplished by processes in which silicic acid in solution is contacted with an ester of an acid of phosphorus and, preferably, water is removed from the mixture. Preferably, the phosphorus acid ester used is a trialkyl ester of a tribasic phosphorus acid in which each alkyl group contains less than nine carbon atoms, and the silicic acid is in the form of polysilicic acid.

The novel compositions produced by the just described methods of this invention are stable compositions of silicic acid which are useful in a variety of applications. The products exhibit many of the properties characteristic of silicic acid compounds but unlike silicic acid they do not tend to polymerize with excessive rapidity even when they contain relatively high proportions of combined silicon. Thus, they are sufficiently stable to make practicable their use in technologies in which an appreciable period of time must elapse between the time of preparation and the time of their use.

In a preferred embodiment of this invention water is removed from a mixture of silicic acid and an ester of an acid of phosphorus. The steps of effecting contact between these components and of removing water may be carried out in any order; that is, uncombined water may be removed from the silicic acid solution before contacting it with a phosphorus acid ester, or water may be removed from the mixture after such contact, or a combination of these methods may be employed.

While unpolymerized silicic acid may be used in the processes and compositions of this invention, the preparation of silicic acid in monomeric form is difficult and impractical, and it is preferred to employ polysilicic acid.

A polysilicic acid solution may be prepared for use in a process of this invention by a variety of methods, some of which are conventional in the art. Thus, a suitable solution of silicic acid may be obtained by the electrodialysis of an aqueous sodium silicate solution. Alternatively, silicon tetrachloride may be hydrolyzed in water. The electrodialysis method is well adapted to the production of silicic acid excellently suited for use in processes of the invention, but unfortunately is relatively slow and requires a considerable investment in manufacturing facilities per unit weight of silicic acid produced. The hydrolysis of silicon tetrachloride, on the other hand, proceeds rapidly but the silicon tetrachloride itself is relatively expensive, and hence the cost of the polysilicic acid produced is relatively high.

A preferred method for producing polysilicic acid for use in this invention is by acidifying a soluble silicate. A variety of silicates which are soluble in acid, such as sodium aluminum silicate, may be used, but ordinarily it is preferred to use sodium silicate because this material represents the ultimate in low-cost soluble silica.

It will be understood that when a polysilicic acid is produced by acidifying a soluble silicate in a process of this invention, a phosphorus acid ester may be included in either the acid or the silicate prior to mixing them and that products of this invention may thus be directly produced upon the formation of the silicic acid.

It has been found that the manner of bringing sodium silicate into contact with acid is very important in producing a silicic acid solution of the desired kind. Thus, for best results it is necessary either that the sodium silicate be added to the acid or that the silicate and the acid be added simultaneously to a mixing zone and in either case that effective dispersion of the reactants at their point of contact be effected, and that the pH be maintained below about 3.0 and preferably below about 1.7. Effective dispersion of the reactants will be understood to mean that the reactants are brought together under conditions such that no substantial local concentration of one or the other is present at the point of mixing or thereafter. Ideally, the solution of silicic acid is maintained completely homogeneous at all times; this ideal is most closely approached by maintaining intense local agitation at the point of mixing as well as good general agitation of the silicic acid solution formed. In the preparation of the preferred compositions of this invention such effective agitation is provided.

In a preferred embodiment of this invention the polysilicic acid used may have a molecular weight ranging from that of disilicic acid up to that of silicic acid in a sol which is polymerized almost to the point of gelling. Preferably the polysilicic acid should have a relatively low molecular weight, but it is not necessary that the molecular weight should be so low as to be substantially dimeric. A solution prepared as above described will have a molecular weight in the desired range, but after their preparation such solutions have a tendency to undergo polymerization with an increase in molecular weight. To minimize this tendency any storage of the solution should be made at relatively low temperatures, say from 20 to 30° C., the storage period should not be prolonged, and the acidity of the solution should be in the pH range from about 1 to 3, preferably about 1.7.

In a particularly preferred embodiment of this invention the relative molecular weight of a polysilicic acid solution and, hence, its relative suitability, may be established according to an empirical test as follows:

A sample of the polysilicic acid solution to be tested is adjusted at the time of the test to a pH of 1.6 and a combined silicon content, expressed as $SiO_2$, of about 4.5% by weight. To a 10 cc. sample of this solution there is added 1 cc. of a solution having a pH of 2.5 and containing 50 grams of diethyl ether of diethylene glycol per 100 cc. of solution. To this mixture is added 5 cc. of a solution having a pH of 2.5 and containing 2% by weight of edible grade gelatine (such as Keystone #546). There is then added a measured volume of a solution having a pH of 2.5 and containing 300 g. per liter of sodium chloride, this solution being run in from a burette with agitation, until the mixture becomes turbid with finely divided white precipitate. Then at once another 1 cc. of the solution of diethyl ether of diethylene glycol is added, which clears up the turbidity, and salt solution is further titrated in to turbidity. Further 1 cc. quantities of the glycol solution are added and salt again added to turbidity.

The total concentrations of salt and of diethyl ether of diethylene glycol are now calculated in terms of grams per 100 cc. of mixture at each turbid-point, i. e., for each different amount of the glycol used. In calculating the total salt content of the mixture account must be taken of any salts already present in the sample. If, for example, sodium chloride is present it must be taken into account. If sodium sulfate is present, its equivalent of NaCl in salting-out power should be taken together with the NaCl in the titrating solution in calculating the total effective NaCl concentration in the system. To determine this equivalent, the titration can be carried out using $Na_2SO_4$ solutions of various concentrations instead of the standard salt solution until one is found which is equivalent in the titration to the standard NaCl solution. Thus, if 10 cc. of a solution of 210 grams per liter of a salt such as $Na_2SO_4$ (of the kind present in the sample of polysilicic acid solution) is found to be equivalent in this titration to 10 cc. of a solution of 280 grams per liter of NaCl, then for each gram of the salt (such as $Na_2SO_4$) present in the 10 cc. sample of the sol, the equivalent NaCl would be $$\frac{280}{210}$$

grams. This equivalent NaCl must be taken into account in calculating the total equivalent NaCl in the titration mixture at the point of turbidity.

Plotting these calculated values of percent total equivalent NaCl against percent of pure diethyl ether of diethylene glycol, a straight line is found. On extrapolating this line to the percent diethyl ether of diethylene glycol axis, the intercept is found indicating the percent of this ether at zero percent NaCl at the point of turbidity.

As polysilicic acid solutions age or polymerize this intercept changes from about −6% to about +4%, the latter value being approached as the sol approaches the gel point, the change proceeding much more slowly as the value approaches +4%.

According to this invention it is preferred to use solutions which give a value of less than about +3%.

By the already described methods of preparation aqueous solutions of polysilicic acid having preferable low molecular weights readily may be obtained. In a preferred process of this invention an ester of an acid of phosphorus may be added directly to such an aqueous solution of polysilicic acid and water may then be removed, or if desired, water may first be removed from the polysilicic acid solution and the phosphorus acid ester added subsequently. When the latter procedure is followed, the polysilicic acid may be transferred into a non-aqueous solvent such as an organic liquid by various means.

A particularly advantageous method for effecting such transfer into the non-aqueous solvent is by salting out the polysilicic acid together with an organic hydrogen bonding donor compound preferably selected from the group consisting of ethers, amides, ketones, and alcohols. It will be understood that while such salted out solutions of polysilicic acid in hydrogen bonding donor compounds are predominantly nonaqueous, they may contain minor amounts of water. An organic hydrogen bonding donor compound suitable for use in such a salting out procedure may readily be selected by reference to the following considerations.

Hydrogen bonding is a concept advanced in recent years to explain certain abnormalities in the chemical and physical behavior of mixtures of compounds one of which, the acceptor, contains hydrogen attached to a strongly negative radical and the other, the donor, contains an atom capable of donating a pair of electrons to form a directional or coordination bond. This concept is well understood in the art, and its application to silicic acid is discussed in Kirk Patent 2,276,315.

When, for use in a process of this invention, polysilicic acid is transferred into solution in an organic hydrogen bonding donor compound by salting out, the donor compound used should be at least sparingly soluble in water and relatively insoluble in brine. Typical of suitable compositions are those shown in the following tabulations.

Ethers

Ethers are among the most effective of hydrogen bonding agents for extracting polysilicic acid from its aqueous solutions. Donors of this class in addition to containing an ether group may advantageously contain an oxygen atom in addition to that in the ether linkage and may contain, say, an additional ether group, a hydroxy group, an amide group, or an ester group. The presence of these groups appears very beneficial. A number of such groups may be present and there may be used, for instance, polyethers which contain hydroxyl groups and ester groups.

As examples of ethers the following are listed:

Dimethyl ether of tetraethylene glycol
Dimethyl ether of diethylene glycol

Butyl ether of diethylene glycol
Ethyl ether of diethylene glycol acetate
Methyl ether of diethylene glycol acetate
Monoethyl ether of diethylene glycol
Monoethyl ether of ethylene glycol
N,N'-bis(beta-methoxyethyl) adipamide
Polyethylene glycol adipate
Diethyl ether of diethylene glycol
Dioxane
Dioxolane
Diethyl ether of ethylene glycol
Dimethyl ether of ethylene glycol
Triethylene glycol dipropionate
N,N'-dimethylmethoxyacetamide
N,N'-adipyldimorpholine
Dimorpholide urea
Polyethylene oxide The term "ether" will be understood to refer to organic compounds containing a carbon-oxygen-carbon ether group in which the carbon atoms attached to the oxygen are not directly attached to each other.

Polyethers obtained by the polymerization or interaction of ethylene oxide, propylene oxide, and the like with other organic substances are useful in modifying silicic acid by reason of ether groups which they contain. The following are examples of such reaction products:

Monomethyl ether of ethylene glycol-ethylene oxide reaction product
Ethanolformamide-ethylene oxide reaction product

Amides

Amides are among the preferred hydrogen bonding donors for extracting polysilicic acid from aqueous solutions. Whereas oxygen is the donor atom in ethers the nitrogen of amides probably acts as the donor atom. Among the most effective compounds of this group are the N-substituted amides and the di-substituted compounds are preferred.

Examples of amides are listed below, ureas and other amides being listed separately:

Ureas:
    Tetramethylurea
    Tetraethylurea
Amides:
    N,N,N',N'-tetramethyladipamide
    N,N-dimethylacetamide
    N,N,N',N'-tetramethylsuccinamide
    N,N,N',N'-tetraethylsuccinamide
    N,N-diethylacetamide
    N,N,N',N'-tetraethyloxamide
    N,N-diethylformamide
    N,N-diethylpropionamide
    N,N-diethylglycolamide
    N-isobutylacetamide
    N-formylhexamethylenimine
    Diethylcyanamide

Ketones

Ketones are among the effective hydrogen bonding agents for extracting polysilicic acid according to the present invention. Donors of this class in addition to containing a keto group may advantageously contain an oxygen in addition to that in the keto linkage or a nitrogen atom, and may contain, say, an ether group, an amide group or an ester group. The presence of these groups appears very beneficial. A number of such groups may be present.

As examples of ketones, the following are listed:

Acetone
Acetonyl acetone
Formacetoethyl ketone
Methyl acetoacetate
Diacetone alcohol
Diacetyl ketone

Alcohols

Alcohols are also among the preferred hydrogen bonding donors for extracting polysilicic acid from aqueous solutions. It will be understood, of course, that when alcohols are used they may serve the dual function of acting as solvents, and especially hydrogen bonding solvents, for the polysilicic acid and also of providing ester groups for reaction with silicic acid. The alcohols referred to in this tabulation are those effective as hydrogen bonding donor compounds for extracting the polysilicic acid from aqueous solutions, and this tabulation does not refer to the suitability or lack of suitability of the alcohols in providing ester groups for the esterification reaction. Preferably the alcohol used as a hydrogen bonding solvent should contain two or more carbon atoms and should have more than two carbon atoms per hydroxyl group.

Examples of alcohols which are effective are listed below:

Diacetone alcohol
Ethanol
N-propanol
Isopropanol
Tertiary amyl alcohol
Tertiary butyl alcohol
N-butanol When an organic hydrogen bonding donor compound is used as a solvent for polysilicic acid in a process of this invention, the polysilicic acid may be transferred from an aqueous solution into the donor compound by the technique of salting out; that is, by mixing the aqueous solution and donor compound and saturating or nearly saturating the water present with a salt. Salting out methods have previously been employed for such purposes as removing dyes from solutions during the course of their manufacture, and the art is familiar with the practice for such purposes. The salt employed should be chemically non-reactive with either the donor compound or the silicic acid. While a variety of salts may be used, such as potassium chloride, potassium sulfate, potassium bromide, calcium chloride, zinc chloride, magnesium sulfate, magnesium chloride, copper sulfate, ammonium chloride, ammonium sulfate, barium chloride, sodium nitrate, sodium sulfamate, ferrous sulfate, and ferric chloride, it is preferred to use sodium chloride or sodium sulfate because of their low cost and non-reactivity with silicic acid and hydrogen bonding donor compounds.

As already pointed out, the technique of salting out the polysilicic acid together with an organic hydrogen bonding donor compound provides one advantageous method for transferring polysilicic acid from an aqueous solution to a non-aqueous solution, or to a solution containing only a minor proportion of water. Other methods of effecting such transfer may be used, or as already pointed out, contact between the polysilicic acid and the phosphorus acid ester may be effected by adding the phosphorus acid ester directly to the aqueous solution of the polysilicic acid.

If in a process of this invention a phosphorus acid ester is added directly to an aqueous solution of polysilicic acid, it is preferable to remove water from the mixture thus obtained. Such water may be removed by a variety of methods. Among such methods are (1) distillation, including distillation at subatmospheric pressure; (2) distillation of water as an azeotrope with excess of the phosphorus acid ester or with an added liquid such as a hydrogen bonding donor compound or a hydrocarbon such as benzene or toluene; (3) by the addition of a dehydrating agent such as anhydrous sodium sulfate; (4) separation of the water as a separate phase as by the salting out technique already described, such as, for example, by saturating the mixture with sodium chloride and gravitationally removing a separate phase containing the polysilicic acid and the phosphorus acid ester. When method (4) is used, however, it is preferred to effect further removal of water by other methods such as (1), (2) and (3) described above.

It is especially desirable that the removal of water be effected rapidly, since from the time the polysilicic acid solution is prepared until most of the water is removed polymerization of the silicic acid takes place and may proceed to the point where the product gels.

The removal of water from the solution of polysilicic acid and ester of phosphorus acid preferably is carried out under acidic conditions. By "acidic" is meant that there is present a medium of such acid character as to be equivalent to a solution of pH less than 7. So long as water is present the pH may, of course, be determined directly, but it will be understood that when solvents other than water are used for the polysilicic acid, acidic conditions may be present by reason of the acid character of the polysilicic acid or of the solvent even though a direct determination of pH may not be possible. Particularly satisfactory results are obtained using conditions such that the acidity is equivalent to a pH of about from 1 to 3 and more particularly of about 1.6. Under these conditions of pH the polymerization of polysilicic acid does not take place to any undesirable extent during the water removal.

Either before or after the removal of water the product may be diluted with a suitable anhydrous solvent. Such a solvent reduces the concentration of polysilicic acids in the mixture and retards polymerization. Suitable solvents include alcohols such as methanol, ethanol, and, butanols, ethers, hydroxy ethers, esters, and ketones.

The esters of phosphorus acids used in the processes and compositions of this invention preferably are esters of phosphorus oxy-acids, that is, esters of phosphoric or phosphorous acids. Preferably such acids are tribasic acids and the esters are trialiphatic esters, that is, the hydroxyl groups of the phosphorus acids are all esterified. Particularly desirable results are obtained using trialkyl esters of tribasic phosphorus acids in which the alkyl groups contain less than nine carbon atoms. One or more of the hydrogen atoms of one or more of the alkyl groups in the ester can be substituted by non-reactive groups, that is, groups which do not interfere with formation of the phosphorus acid ester solution of polysilicic acid, such as ether, alcohol, halide, mercaptan, sulfide, ketone, ester, amide, nitro, or nitrile groups, or combinations of such groups.

Specifically, there may be used to great advantage in the processes and compositions of this invention trialkyl phosphates and trialkyl phosphites in which the alkyl groups are methyl, ethyl, n-propyl, secondary butyl, n-butyl, n-amyl, n-heptyl, ethoxyethyl, methoxyethoxyethyl, ethoxyethoxyethyl, butoxyethyl, hexyl, octyl, or beta-chloroethyl. The alkyl groups in a particular ester may be alike or different. Particularly desirable results may be obtained when the alkyl groups contain less than five carbon atoms.

The maximum concentration of polysilicic acids which can be incorporated in a phosphorus acid ester increases as the water solubility of the phosphorus acid ester increases. The phosphorus acid ester should preferably be soluble in water to the extent of at least 0.1%, and desirably may be miscible with water in all proportions.

By the processes of this invention above described and their equivalents, novel compositions are produced comprising polysilicic acid associated with esters of acids of phosphorus. Such products may be solutions of polysilicic acid in the phosphorus acid esters or the polysilicic acid may be at least partially esterified with ester groups originally present on the phosphorus acid esters. The products may comprise complexes of polysilicic acid associated with the phosphorus acid esters by reason of hydrogen bonding, the esters acting as hydrogen bonding donor compounds. The products may be mixtures of esters and hydrogen bonded complexes.

The products of this invention are useful in a large number of applications. They are excellent adhesives for sticking oxygen-containing organic polymers to one another or to glass. They are also useful for incorporating silicic acid into organic polymeric materials to increase their hardness and adhesion to glass.

An important use of these materials is as intermediates for preparing salt and acid-free solutions of polysilicic acids in other solvents. When, for example, a hydrocarbon such as benzene, naphtha, or xylene is added to a tributyl phosphate solution of polysilicic acids, preferably containing at least 1% of free water, a precipitate of polysilicic acids is obtained. The precipitated polysilicic acids become insoluble on standing. However, within a few minutes after they have been precipitated they can be redissolved in a variety of organic solvents. These include alcohols such as methanol, ethanol, the propanols, the butanols, ethylene glycol, glycerol, etc.; ethers which contain more than one ether oxygen atom such as dioxane, dioxolane, dimethyl ether of ethylene glycol, etc.; hydroxyethers such as monomethyl ether of ethylene glycol, monoethyl ether of diethylene glycol, etc.; amides such as formamide, dimethylformamide, bis-(beta-hydroxyethyl) acetamide, etc.; ketones such as acetone, methyl ethyl ketone, cyclohexanone, etc.; and esters such as methyl formate, methyl acetate, ethyl acetate, butyl acetate, etc.

These solutions of polysilicic acids in volatile solvents, such as acetone, methanol, and ethanol, are in turn useful for producing homogeneous solid compositions containing polysilicic acids. For example, an acetone solution of polysilicic acids is mixed with an acetone solution of butylurea, octylurethane, amyllauramide, or a solid polyethylene oxide. When the acetone is volatilized, a homogeneous composition comprising polysilicic acids and the solid organic compound is obtained.

Solutions of polysilicic acids in water-insoluble phosphorus acid esters are useful for preparing aqueous solutions of polysilicic acids free of salts and acids other than silicic acid. The solution of polysilicic acids in tributyl phosphate, for example, is shaken with water and the resulting aqueous solution of polysilicic acids is separated.

Benzene or some other hydrocarbon solvent facilitates separation of the aqueous solution from the phosphorus acid esters.

The nature of this invention may be better understood by reference to the following illustrative examples which show the preparation of solutions of polysilicic acid in phosphorus acid esters. In Example I the ester is a water soluble, short-chain trialkyl phosphate; in Example II it is a slightly water soluble short-chain trialkyl phosphate whose alkyl groups bear chlorine atoms as substituents; in Example III it is a slightly water-soluble, longer-chain trialkyl phosphate; and in Example IV it is a slightly water-soluble trialkyl phosphite.

*Example I*

Nine hundred grams (900 g.) of a 15.5% solution of sodium silicate ($SiO_2:Na_2O=3.25:1$ by weight) is added to a vigorously stirred solution of 214 g. of triethyl phosphate in 860 g. of 7% sulfuric acid over a period of 10 minutes. To the resulting solution 450 g. of sodium chloride is added and stirring is continued for 1 hour. The mixture is allowed to stand for 1 hour, and the solution of polysilicic acids in triethyl phosphate which separates as a lower layer is drawn off and dried over anhydrous sodium sulfate. The yield is 215 g. of clear, fluid, amber liquid which gels in approximately 4 days at room temperature.

When the triethyl phosphate solution of polysilicic acids is dehydrated further by heating under reduced pressure, it becomes stable for at least several months at room temperature. The dry solution is miscible with several times its volume of benzene and is soluble in most other common organic solvents. It is not soluble in water. A typical dry triethyl phosphate solution of polysilicic acids has the following composition:

| Percent $SiO_2$ | Percent C | Percent H | Percent P |
|---|---|---|---|
| 21.84 | 29.78 / 30.10 | 6.77 / 6.92 | 12.84 / 12.42 |

*Example II*

Four hundred fifty grams (450 g.) of a 15.5% solution of sodium silicate ($SiO_2:Na_2O=3.25:1$ by weight) is added to a vigorously stirred mixture consisting of 139 g. of tris-(beta-chloroethyl) phosphate and 430 g. of 7% sulfuric acid over a period of 5 minutes. Stirring is continued for 8 minutes and then 240 g. of salt is added. As soon as the salt is in solution, the mixture is centrifuged. The lower liquid layer of tris(beta-chloroethyl) phosphate solution is separated from the aqueous layer and dried over anhydrous sodium sulfate. The yield of tris(beta-chloroethyl) phosphate solution of polysilicic acids is 106 g. This product does not gel in several months and is soluble in most common organic solvents, e. g., ethanol, but not in hydrocarbons and chlorinated hydrocarbons. Its composition is as follows:

| Percent $SiO_2$ | Percent P | Percent C | Percent H | Percent Cl |
|---|---|---|---|---|
| 17.0 | 8.39 / 8.78 | 24.17 / 23.85 | 4.24 / 4.39 | 30.32 / 29.87 |

*Example III*

An aqueous solution of polysilicic acids is prepared by adding 900 g. of a 15.5% solution of sodium silicate ($SiO_2:Na_2O=3.25:1$ by weight) to 860 g. of a vigorously stirred solution of 7% aqueous sulfuric acid over a period of 10 minutes. To the resulting solution 196 g. of tributyl phosphate and 460 g. of sodium chloride are added. Stirring is continued for 1 hour and then the mixture is allowed to stand for 1 hour. The upper, tributyl phosphate layer is separated, centrifuged, and dried over anhydrous sodium sulfate. The yield of clear, amber, tributyl phosphate solution of polysilicic acids is 125 g. Its composition and properties are as follows:

| Percent $SiO_2$ | Percent C | Percent H | Percent P | Percent free water |
|---|---|---|---|---|
| 16.5 | 43.86 | 9.02 | 8.91 | 3.4 |

Specific gravity, 25°/25°, 1.0842
Refractive index at 25° C., 1.4269

The product does not gel in several months. The free water is substantially removed from the solution by heating it at 70 to 75° C. for 2 hours under a pressure of 15 mm. of mercury. The resulting dry solution is soluble in several times its volume of benzene or naphtha.

*Example IV*

An aqueous solution of polysilicic acids is prepared by adding 112 g. of a 15.5% solution of sodium silicate ($SiO_2:Na_2O=3.25:1$ by weight) to 107 g. of a vigorously stirred solution of 7% aqueous sulfuric acid over a period of 5 minutes and allowed to stand for 1 hour. To it are added with stirring 25 g. of tributyl phosphite and 60 g. of sodium chloride. Stirring is continued for 10 minutes and the resulting mixture is centrifuged. The upper, tributyl phosphite layer is separated from the aqueous layer and dried over anhydrous sodium sulfate. The clear, colorless, dry product, a solution of polysilicic acids in tributyl phosphite, is obtained in a yield of 16 g. It contains 26% $SiO_2$.

While in the foregoing description of this invention certain specific processes and compositions have been described, it will be understood that without departing from the spirit of the invention those skilled in the art may readily employ numerous processes and produce numerous products.

We claim:

1. In a process for improving the stability against jelling of a polysilicic acid solution the steps comprising mixing together an aqueous polysilicic acid solution and a trialkyl ester of phosphoric acid in which the alkyl group contains less than five carbon atoms, and removing water from the mixture.

2. In a process for improving the stability against jelling of polysilicic acid solutions the steps comprising mixing together an aqueous polysilicic acid solution and triethyl phosphate, and removing water from the mixture.

3. A polysilicic acid composition having improved stability against jelling comprising a solution of a polysilicic acid in triethyl phosphate, the composition being substantially free of uncombined water.

RALPH K. ILER.
JOSEPH S. KIRK.